United States Patent

Leonelli, Jr. et al.

[11] Patent Number: 6,010,148
[45] Date of Patent: Jan. 4, 2000

[54] AIR BAG COVER WITH MEMBRANE TYPE HORN SWITCH

[75] Inventors: Frank P. Leonelli, Jr., Gilbert; David G. Magoteaux, Mesa, both of Ariz.

[73] Assignee: TRW Inc., Lyndhurst, Ohio

[21] Appl. No.: 08/946,153

[22] Filed: Oct. 7, 1997

[51] Int. Cl.[7] .................................................. B60R 21/20
[52] U.S. Cl. ........................... 280/728.3; 200/61.54
[58] Field of Search ............................. 280/731, 728.3; 200/61.54

[56] References Cited

U.S. PATENT DOCUMENTS

| | | | |
|---|---|---|---|
| 5,577,766 | 11/1996 | Niwa et al. | 280/731 |
| 5,625,333 | 4/1997 | Clark et al. | 338/2 |
| 5,630,617 | 5/1997 | Hashiba | 280/731 |
| 5,678,851 | 10/1997 | Saito et al. | 280/731 |
| 5,855,392 | 1/1999 | Simpson et al. | 280/731 |

Primary Examiner—Peter C. English
Attorney, Agent, or Firm—Tarolli, Sundheim, Covell, Tummino & Szabo L.L.P.

[57] ABSTRACT

An apparatus (10) for covering an inflatable vehicle occupant protection device (40) includes a cover (70) including a portion (82) movable upon inflation of the inflatable device from a closed condition to an open condition. A membrane switch (100) underlying the cover (70) is in an electric circuit for actuating an electrically actuatable device (102) of the vehicle. The cover (70) is engageable by the vehicle occupant to operate the membrane switch (100) and thereby to actuate the electrically actuatable device (102). The apparatus (10) includes a back plate (110) for the membrane switch (100). The back plate (110) has a plurality of fastener openings (120). The cover (70) has a plurality of projections (90) extending with an interference fit through the fastener openings (120) in the back plate (110) to secure the back plate to the cover.

7 Claims, 2 Drawing Sheets

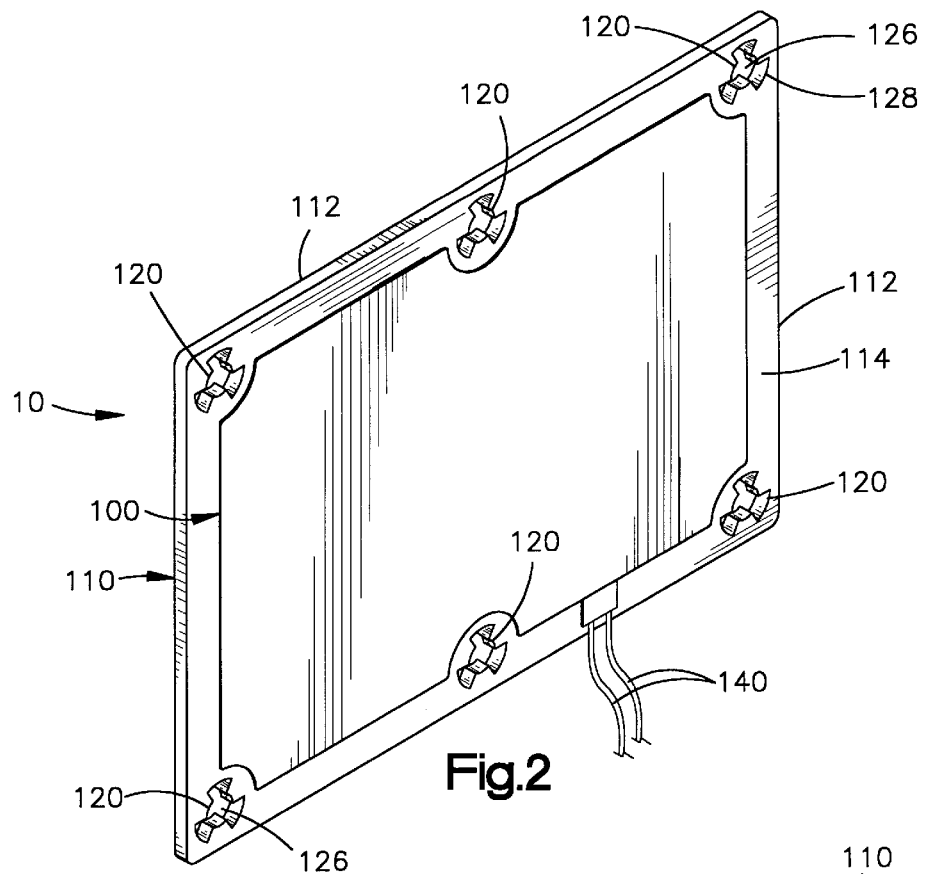
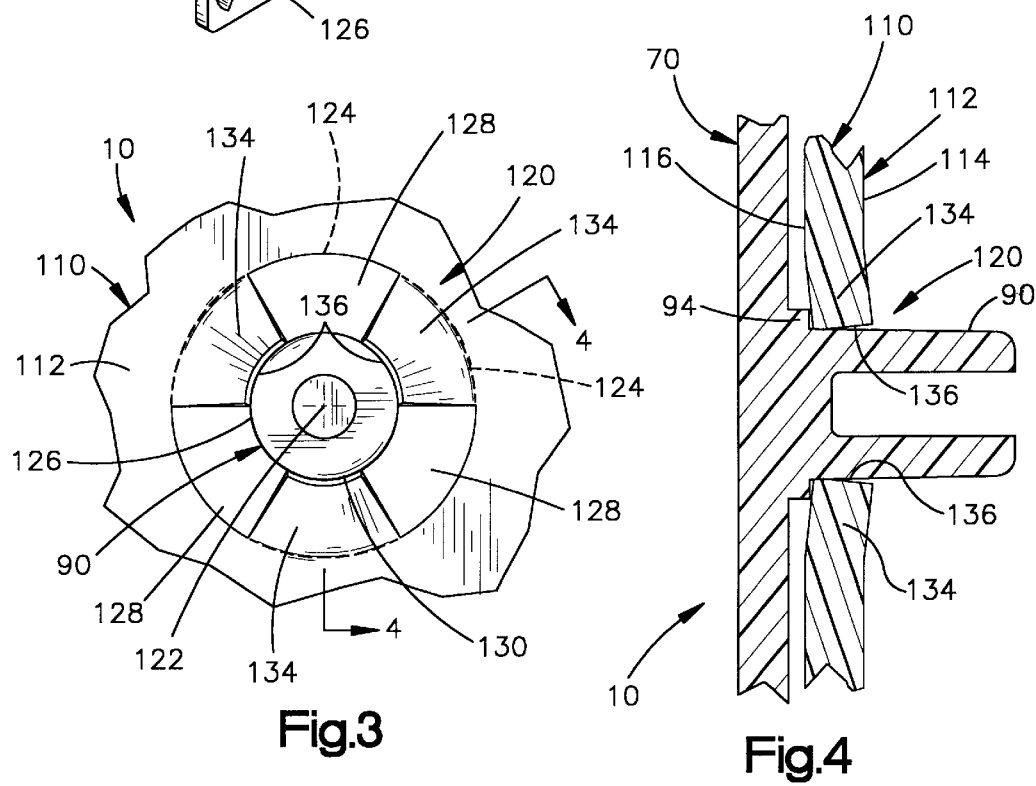

AIR BAG COVER WITH MEMBRANE TYPE HORN SWITCH

BACKGROUND OF THE INVENTION

1. Technical Field

The present invention relates to a switch for mounting on a portion of a vehicle as part of a vehicle safety apparatus. In particular, the present invention relates to a horn switch that is part of an air bag module mounted on a vehicle steering wheel.

2. Description of the Prior Art

It is known to mount an air bag module on a steering wheel of a vehicle to help protect the driver of the vehicle. The air bag module includes an air bag and an inflator. In the event of sudden vehicle deceleration of a magnitude which requires protection of the driver, the inflator is actuated to inflate the air bag into a position to help protect the driver of the vehicle.

It is known to provide a horn switch that is operable by pressing on a cover of an air bag module mounted on a vehicle steering wheel. For example, U.S. Pat. No. 5,625,333 discloses a membrane type horn switch which is heat staked to the inside of an air bag module cover.

SUMMARY OF THE INVENTION

The present invention is an apparatus for covering an inflatable vehicle occupant protection device. The apparatus comprises a cover including a portion movable upon inflation of the inflatable device from a closed condition to an open condition. A membrane switch underlying the cover is in an electric circuit for actuating an electrically actuatable device of the vehicle. The cover is engageable by the vehicle occupant to operate the membrane switch and thereby to actuate the electrically actuatable device. The apparatus includes a back plate for the membrane switch, the back plate having a plurality of fastener openings. The cover has a plurality of projections extending with an interference fit through the fastener openings in the back plate to secure the back plate to the cover.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a perspective view of the horn switch of FIG. 1 mounted on a back plate;

FIG. 3 is a plan view illustrating the fastening of the back plate to a cover of the air bag module; and FIG. 4 is a sectional view taken generally along line 4—4 of FIG. 3.

DESCRIPTION OF A PREFERRED EMBODIMENT

Figure 1:
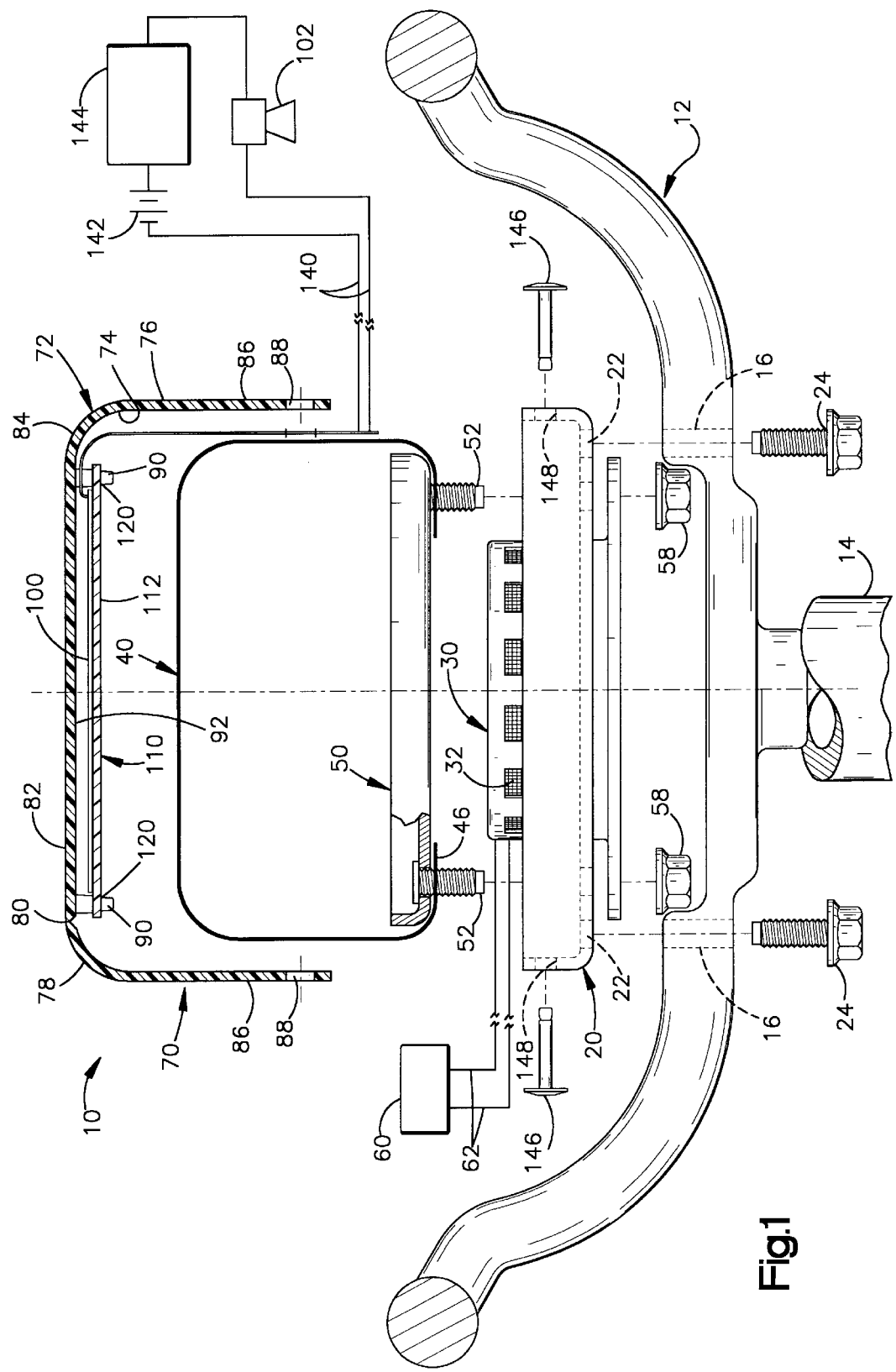
FIG. 1 is a schematic view, partially in section, showing a horn switch as part of an air bag module mounted on a vehicle steering wheel.

The present invention relates to a vehicle safety apparatus including a switch. In particular, the present invention relates to an air bag module which includes a switch for an electrically actuatable device of the vehicle, such as a vehicle horn. As representative of the present invention, FIG. 1 illustrates an air bag module 10.

The air bag module 10 is mounted on a vehicle steering wheel, a portion of which is shown at 12. The steering wheel 12 is supported on a steering shaft or steering column of the vehicle indicated schematically at 14. A plurality of fastener openings 16 are formed in the steering wheel 12.

The air bag module 10 includes a support or base plate 20 which is preferably made from steel or aluminum. A plurality of fastener openings 22 are spaced apart around the periphery of the base plate 20. A plurality of bolts 24 extend through the fastener openings 16 in the steering wheel 12 and are screwed into the fastener openings 22 in the base plate 20. The bolts 24 secure the base plate 20 to the steering wheel 12.

The air bag module 10 includes an inflator 30 which is supported in a known manner (not shown) on the base plate 20. The inflator 30 has one or more fluid outlets 32 for directing inflation fluid into an air bag 40 upon actuation of the inflator. The inflator 30 is illustrated as a pyrotechnic inflator which uses the combustion of gas-generating material to generate inflation fluid in the form of gas to inflate the air bag 40. The module 10 alternatively could include an inflator which contains a stored quantity of pressurized inflation fluid, or a combination of pressurized inflation fluid and ignitable material for heating the inflation fluid.

The air bag 40 is illustrated schematically in a deflated, packed condition in FIG. 1. The air bag 40 is preferably made from a fabric material such as woven nylon. The air bag 40 can alternatively be made from non-woven material, such as plastic film. The use of plastic film, in particular, would require inflation fluid vents to be formed in the air bag 40, as is known in the art.

The module 10 includes a retaining ring 50 from which extend a plurality of fasteners 52, such as weld studs. The fasteners 52 on the retaining ring 50 extend through openings in an end portion 46 of the air bag 40. The retaining ring 50 is secured to the base plate 20 by nuts 58 screwed onto the fasteners 52. The end portion 46 of the air bag 40 is clamped between the retaining ring 50 and the base plate 20. As a result, the air bag 40 is secured in position on the vehicle steering wheel 12, adjacent to the inflator 30.

The vehicle includes known means 60 for sensing a collision involving the vehicle and for actuating the inflator 30 in response to the sensing of a collision. The means 60 may include a deceleration sensor and vehicle electric circuitry for actuating the inflator 30 in response to sensing a vehicle deceleration indicative of a vehicle collision having a severity greater than a predetermined threshold value. As discussed below, the means 60 provides an electric signal over lead wires 62 to the inflator 30, when the inflator is to be actuated.

The air bag module 10 includes a cover 70 for enclosing the air bag 40 and the inflator 30. The cover 70 is made from a material which is strong enough to protect the parts of the air bag module 10 which are enclosed within the cover. The material of the cover 70 is sufficiently flexible or deformable that it can be resiliently deformed inwardly (that is, in a downward direction as viewed in FIG. 1) by pressure from an occupant of the vehicle, so as to actuate an electrical device of the vehicle such as the vehicle horn.

The cover 70 has a main body portion 72 which has inner and outer side surfaces 74 and 76. The main body portion 72 of the cover 70 includes a fixed part 78 of the cover. A tear seam 80 is formed in the cover 70 to enable inflation of the air bag 40 out of the cover. The tear seam defines a movable part 82 of the cover 70. The movable part 82 of the cover 70 is pivotable relative to the fixed part 78, about a hinge portion 84 of the cover, in a clockwise direction as viewed in FIG. 1, upon inflation of the air bag 40 and rupturing of the tear seam 80.

A mounting flange or mounting portion 86 of the cover 70 extends from the main body portion 72 in a direction toward the base plate 20. A plurality of fastener openings 88 are formed in the mounting portion 86 of the cover 70. Rivets 146 extend through the fastener openings 88 in the mounting portion 86 of the cover 70 and through fastener openings 148 in the base plate 20. The mounting portion 86 of the cover 70 is thereby clamped to the base plate 20.

A plurality of identical fasteners are formed on the cover 70, in the form of pins 90. The pins 90 project inward from the inner side surface 92 of the movable cover part 82. The pins 90 are spaced apart in an array on the inside of the movable cover part 82. In the illustrated embodiment, six of the pins 90 are provided; the number of pins can be different for a module of a different design or configuration. A standoff 94 (FIG. 4) is provided at each pin 90.

The air bag module 10 includes a switch assembly or switch 100 for actuating an electrically actuatable device of the vehicle, such as a vehicle horn indicated schematically at 102 (FIG. 1). In the preferred embodiment, the switch 100 is a known membrane type switch which includes first and second layers of electrically conductive material (not shown) normally separated by a dielectric material. The layers of conductive material are engageable with each other, in response to the application of force to the switch 100, to change the resistance of the switch.

The switch 100 is mounted with a backer plate or back plate 110 at a position underlying the movable cover part 82. The switch 100 is located between the back plate 110 and the inner side surface 92 of the movable cover part 82. The back plate 110 is made from a material which is more rigid than the material of the cover 70. The back plate 110 provides a rigid support for the switch 100, so that force applied to the cover 70 can result in operation of the switch.

The back plate 110 has a main body portion 112 with opposite major side surfaces 114 and 116. A plurality of identical fastener openings 120 in the back plate 110 extend between the major side surfaces 114 and 116 of the back plate. The fastener openings 120 are spaced apart around the outer periphery of the back plate 110.

Each one of the fastener openings 120 has a center 122 and an outer periphery 124. Each fastener opening 120 includes within its outer periphery 124 a circular central portion 126 and three generally trapezoidal side portions 128.

The three side portions 128 of each fastener opening 120 are defined by three fingers 134 which project radially inward, toward the center 122, from the outer periphery 124 of the fastener opening. The fingers 134 are formed as one piece with the main body portion 112 of the back plate 110. The fingers 134 normally lie in the plane of the main body portion 112 of the back plate 110. Each one of the fingers 134 has an arcuate inner peripheral edge surface 136. The edge surfaces 136 of the fingers 134 define an outer periphery 130 of the circular central portion 126 of the fastener opening 120.

The back plate 110 is mounted to the cover 70 by moving the back plate in a direction toward the inner side surface 92 of the movable cover part 82 (upward as viewed in FIG. 1, to the left as viewed in FIG. 4). The switch 100 is positioned between the cover 70 and the back plate 110. The pins 90 on the cover 70 extend into and through the fastener openings 120 in the back plate 110. The inner side surface 116 of the back plate 110 engages the standoffs 94 on the cover 70. The standoffs 94 maintain the back plate 110 a predetermined distance from the cover 70 with the switch 100 between the back plate and the cover. (The spacing of the parts is exaggerated for clarity in FIG. 1.) Each pin 90 has an interference fit in its associated fastener opening 120. The diameter of the pin 90 is selected to be slightly larger than the diameter of the outer periphery 130 of the central portion 126 of the fastener opening 120. As a result, the three fingers 134 at each fastener opening 120 are forced apart by the pin 90 and deflect slightly as the pin moves into and through the opening. This deflection occurs even though the back plate 110 is made from a relatively rigid material.

When each pin 90 is fully in its associated fastener opening 120 as shown in FIG. 4, the fingers 134 at each opening are deflected out of the plane of the main body portion 112 of the back plate 110. The inner edge surfaces 136 of the fingers 134 dig into the softer material of the pins 90 of the cover 70. The engagement of the fingers 134 on the back plate 110 with the pins 90 on the cover 70 resists movement of the pins out of the fastener openings 120 in the back plate. As a result, the back plate 110 is securely held in position on the cover 70, so that when an occupant of the vehicle presses on the cover, the switch 100 is actuated. The standoffs 94 are substantially larger in diameter and do not extend into the fastener openings 120 in the back plate 110.

A pair of lead wires 140 or other known type of electrical conductor extend from the switch 100. The lead wires 140 connect the switch 100 with the vehicle horn 102, with a power source 142 such as the vehicle battery, and with vehicle electric circuitry indicated schematically at 144.

To effect operation of the vehicle horn 102, the driver of the vehicle presses on the cover 70 of the air bag module 10 in a downward direction as viewed in FIG. 1. The force applied to the cover 70 of the air bag module 10 is transmitted through the cover to the switch 100. The switch 100, supported by the back plate 110, is operated, and the vehicle horn 102 is energized.

When the force on the cover 70 of the air bag module 10 is released, the resilience of the cover causes it to move away from the air bag 40. As this movement occurs, the switch 100 returns to its original condition. The electrical resistance of the switch 100 returns to its initial level. This change in the resistance of the switch 100 is sensed by the vehicle electric circuitry 144, and the vehicle horn 102 is de-energized.

In the event of an impact to the vehicle of a magnitude greater than the predetermined threshold value, the sensing means 60 provides an electrical signal over the wires 62 to the inflator 30. The inflator 30 is actuated in a known manner. Inflation fluid flows out of the inflator 30 through the fluid outlets 32 and into the air bag 40. The rapidly flowing inflation fluid causes the air bag 40 to inflate in an upward direction as viewed in FIG. 1.

The force of the inflating air bag 40 is applied against the inside of the switch 100 and the cover 70. Specifically, the inflating air bag 40 pushes outward against the back plate 110 and against the inner side surface 74 of the cover 70, including the inner side surface 92 of the movable cover part 82. The cover 70 opens along the tear seam 80, which is the predetermined weakened portion of the cover. The cover 70 opens sufficiently that the air bag 40 inflates into a position to help protect the vehicle occupant. When the cover 70 moves to the open condition, the switch 100 moves with the movable cover part 82.

The switch 100 can be used to actuate an electrically actuatable device of the vehicle other than the vehicle horn 102. For example, the switch 100 could be used to actuate or control the vehicle radio, speed control, etc. Alternatively, the switch 100 could have a plurality of electrically independent active areas for controlling a plurality of electrically actuatable devices including the vehicle horn 102.

From the above description of the invention, those skilled in the art will perceive improvements, changes and modifications. For example, the present invention is not limited to an air bag module which is mounted on a vehicle steering wheel. The present invention can be used with an air bag module mounted on a vehicle instrument panel, a vehicle seat or door panel, or other portion of the vehicle. Such improvements, changes and modifications within the skill of the art are intended to be covered by the appended claims.

Having described the invention, we claim:

1. An apparatus for covering an inflatable vehicle occupant protection device, comprising:

a cover including a portion movable upon inflation of the inflatable device from a closed condition to an open condition;

a membrane switch underlying said cover and in an electric circuit for actuating an electrically actuatable device of the vehicle;

said cover being engageable by the vehicle occupant to operate said membrane switch thereby to actuate the electrically actuatable device; and a back plate for said membrane switch, said back plate having a plurality of fastener openings;

said cover having a plurality of projections extending with an interference fit through said fastener openings in said back plate to secure said back plate to said cover;

said back plate including a plurality of deflectable portions disposed around each one of said fastener openings in said back plate, said deflectable portions of said back plate being deflectable into interlocking engagement with said projections in response to movement of said projections into said openings, said deflectable portions of said back plate having inner edge surfaces that dig into said projections on said cover to resist movement of said projections out of said fastener openings in said back plate.

2. An apparatus for covering an inflatable vehicle occupant protection device, comprising:

a cover including a portion movable upon inflation of the inflatable device from a closed condition to an open condition;

a membrane switch underlying said cover and in an electric circuit for actuating an electrically actuatable device of the vehicle;

said cover being engageable by the vehicle occupant to operate said membrane switch thereby to actuate the electrically actuatable device; and a back plate for said membrane switch, said back plate having a plurality of fastener openings;

said cover having a plurality of non-threaded, axial projections extending with an interference fit through said fastener openings in said back plate to secure said back plate to said cover, said projections being integral to said cover and constructed of the same material as said cover, each one of said plurality of fastener openings in said back plate having a circular central portion and a plurality of side portions defined by deflectable portions of said back plate, said projections and said deflectable portions establishing said interference fit to secure said cover and said back plate together in response to axial movement of said projections into said openings.

3. An apparatus as set forth in claim 2 wherein said deflectable portions of said back plate, at each one of said fastener openings, project radially inward from a main body portion of said back plate in a direction toward the center of said circular central portion of said fastener opening.

4. An apparatus as set forth in claim 3 wherein each one of said deflectable portions of said back plate has an arcuate inner peripheral edge surface engageable with a respective one of said projections upon engagement of said back plate with said cover.

5. An apparatus as set forth in claim 4 wherein said inner edge surfaces of said deflectable portions of said back plate dig into said projections on said cover to resist movement of said projections out of said fastener openings in said back plate.

6. An apparatus as set forth in claim 5 wherein the diameter of said projections is selected to be slightly larger than the diameter of said circular central portion of said fastener openings, said deflectable portions of said back plate at each one of said fastener openings being forced apart by said projections and deflecting as said projections move into and through said fastener openings.

7. An apparatus as set forth in claim 6 wherein each one of said projections has a standoff which is substantially larger than its associated fastener opening and which does not extend into said fastener opening.

* * * * *